(12) United States Patent
Murphy et al.

(10) Patent No.: US 9,005,029 B2
(45) Date of Patent: *Apr. 14, 2015

(54) PHYSICAL CHARACTERISTICS BASED USER IDENTIFICATION FOR MATCHMAKING

(75) Inventors: Brian Scott Murphy, Seattle, WA (US); Stephen G. Latta, Seattle, WA (US); Darren Alexander Bennett, Seattle, WA (US); Pedro Perez, Kirkland, WA (US); Shawn C. Wright, Sammamish, WA (US); Relja Markovic, Seattle, WA (US); Joel B. Deaguero, Snohomish, WA (US); Christopher H. Willoughby, Kenmore, WA (US); Ryan Lucas Hastings, Seattle, WA (US); Kevin Geisner, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

This patent is subject to a terminal disclaimer.

(21) Appl. No.: 13/619,349

(22) Filed: Sep. 14, 2012

(65) Prior Publication Data

US 2013/0013093 A1 Jan. 10, 2013

Related U.S. Application Data

(63) Continuation of application No. 13/153,833, filed on Jun. 6, 2011, now Pat. No. 8,317,623.

(51) Int. Cl.
G06F 17/00 (2006.01)
A63F 13/30 (2014.01)
A63F 13/20 (2014.01)

(52) U.S. Cl.
CPC .............. *A63F 13/12* (2013.01); *A63F 13/06* (2013.01); *A63F 2300/1093* (2013.01); *A63F 2300/5546* (2013.01); *A63F 2300/5566* (2013.01); *A63F 2300/61* (2013.01); *A63F 2300/695* (2013.01)

(58) Field of Classification Search
USPC ............................................. 463/40–44; 705/1
See application file for complete search history.

(56) References Cited

U.S. PATENT DOCUMENTS

| | | | |
|---|---|---|---|
| 6,129,660 A | 10/2000 | Nakazeki et al. | |
| 6,641,481 B1 | 11/2003 | Mai et al. | |
| 7,614,955 B2 | 11/2009 | Farnham et al. | |
| 7,677,970 B2 | 3/2010 | O'Kelley, II et al. | |
| 7,682,251 B2 | 3/2010 | Bortnik et al. | |
| 8,317,623 B1 | 11/2012 | Murphy | |
| 8,342,967 B2 * | 1/2013 | Thakkar et al. | 463/42 |
| 8,348,765 B1 * | 1/2013 | Thakkar et al. | 463/42 |

(Continued)

OTHER PUBLICATIONS

"Non-Final Office Action", U.S. Appl. No. 13/153,833, (Mar. 9, 2012), 7 pages.

(Continued)

*Primary Examiner* — Ronald Laneau
(74) *Attorney, Agent, or Firm* — Aaron Chatterjee; Kate Drakos; Micky Minhas

(57) ABSTRACT

One or more physical characteristics of each of multiple users are detected. These physical characteristics of a user can include physical attributes of the user (e.g., the user's height, length of the user's legs) and/or physical skills of the user (e.g., how high the user can jump). Based on these detected one or more physical characteristics of the users, two or more of the multiple users to share an online experience (e.g., play a multi-player game) are identified.

20 Claims, 7 Drawing Sheets

(56) References Cited

U.S. PATENT DOCUMENTS

| | | |
|---|---|---|
| 8,672,764 B2 * | 3/2014 | Graepel et al. .................. 463/42 |
| 2004/0097287 A1 | 5/2004 | Postrel |
| 2006/0135264 A1 | 6/2006 | Shaw et al. |
| 2006/0160639 A1 | 7/2006 | Klein |
| 2006/0247055 A1 | 11/2006 | O'Kelley et al. |
| 2009/0170608 A1 | 7/2009 | Herrmann et al. |
| 2009/0307762 A1 | 12/2009 | Cudd, Jr. |
| 2009/0325709 A1 | 12/2009 | Shi |
| 2012/0309538 A1 | 12/2012 | Murphy et al. |

OTHER PUBLICATIONS

"Notice of Allowance", U.S. Appl. No. 13/153,833, (Aug. 13, 2012), 4 pages.

Ghazarian, Arin et al., "Automatic Detection of Users' Skill Levels Using High-Frequency User Interface Events", *User Modeling and User-Adapted Interaction*, vol. 20, No. 2, 109-146, DOI: 10.1007/s11257-010-9073-5., (Feb. 16, 2010), pp. 109-146.

Luban, Pascal "The Megatrends of Game Design, Part 3", retrieved from:<http://www.qamasutra.com/view/feature/3869/the_meqatrends_of_game_design_.php?print=1> on Mar. 15, 2011, (Dec. 3, 2008), 5 pages.

* cited by examiner

PHYSICAL CHARACTERISTICS BASED USER IDENTIFICATION FOR MATCHMAKING

RELATED APPLICATIONS

This application is a continuation of U.S. patent application Ser. No. 13/153,833, filed Jun. 6, 2011, entitled "Physical Characteristics Based User Identification For Matchmaking", which is hereby incorporated by reference herein in its entirety.

BACKGROUND

Online gaming services allow users to play games by themselves, or to play games together with one or more of their friends. While playing games together with friends is very enjoyable for many users, it is not without its problems. One such problem is that it can be difficult for a user to select which other users he or she would enjoy playing a game with. This selection process can be frustrating for users, reducing the user friendliness of the games.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, one or more physical characteristics for each of multiple users is detected. Based at least in part on the detected one or more physical characteristics of the multiple users, two or more of the multiple users to share an online experience (e.g., play a multi-player game) are identified.

In accordance with one or more aspects, one or more physical characteristics of a user are detected. An indication of one or more physical characteristics of each of multiple other users is obtained. Based at least in part on the one or more physical characteristics of the user and the one or more physical characteristics of at least one of the multiple other users, at least one of the multiple other users to share an online experience (e.g., play a multi-player game) with the user are identified.

BRIEF DESCRIPTION OF THE DRAWINGS

The same numbers are used throughout the drawings to reference like features.

DETAILED DESCRIPTION

Physical characteristics based user identification for matchmaking is discussed herein. Physical characteristics of each of multiple users are detected. These physical characteristics of a user can include physical attributes of the user (e.g., the user's height, length of the user's legs) and/or physical skills of the user (e.g., how high the user can jump, how fast the user moves his or her arms). The detected physical characteristics of the users are used as a factor in identifying users for matchmaking so that the users can share an online experience (e.g., play an online game together).

Figure 1:
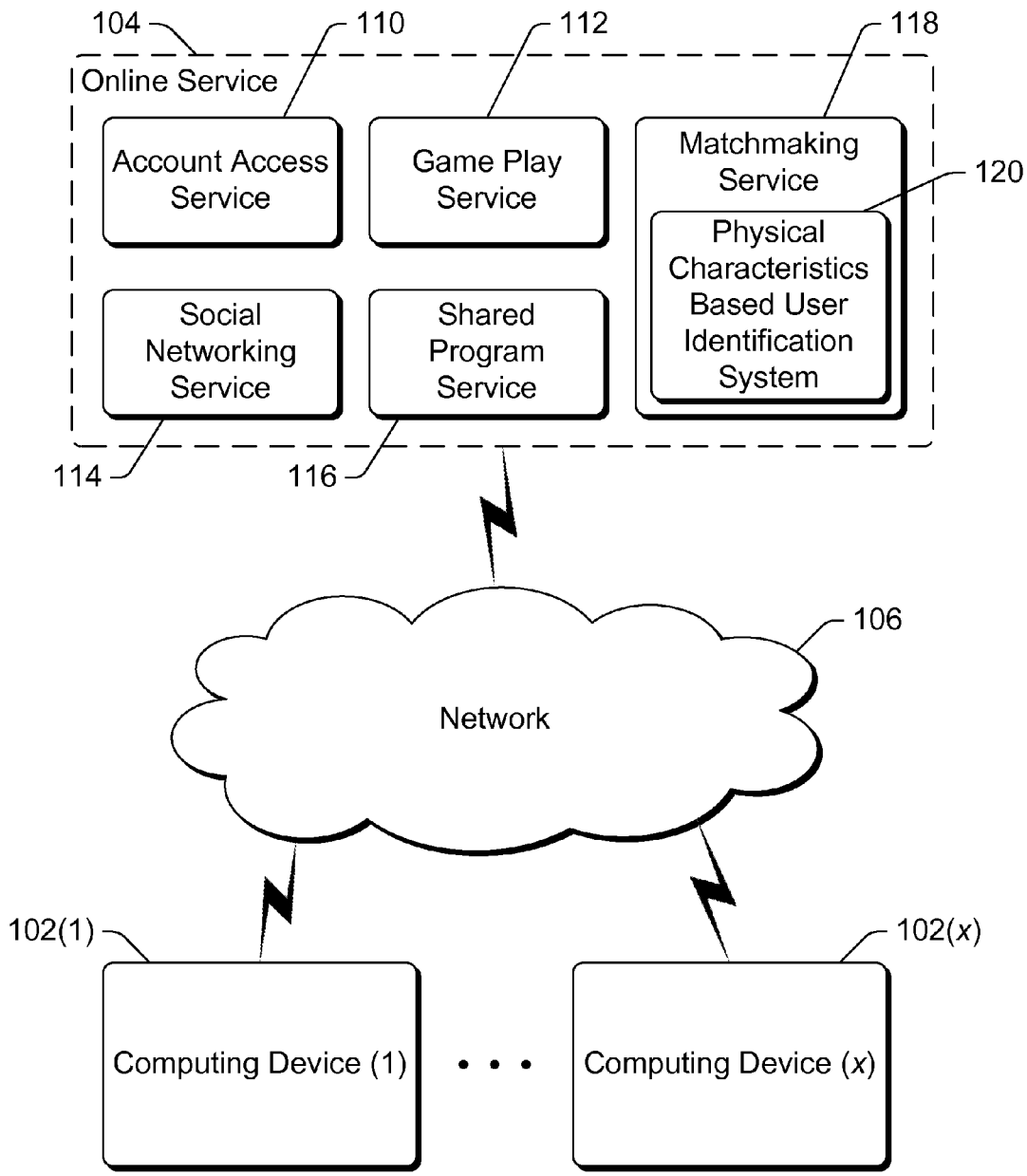
FIG. 1 illustrates an example system implementing the physical characteristics based user identification for matchmaking in accordance with one or more embodiments.

FIG. 1 illustrates an example system 100 implementing the physical characteristics based user identification for matchmaking in accordance with one or more embodiments. System 100 includes multiple (x) computing devices 102 and an online service 104 that can communicate with one another via a network 106. Network 106 can be a variety of different networks, including the Internet, a local area network (LAN), a wide area network (WAN), a personal area network (PAN), a phone network, an intranet, other public and/or proprietary networks, combinations thereof, and so forth.

Each computing device 102 can be a variety of different types of computing devices. Different ones of computing devices 102 can be the same or different types of devices. For example, computing device 102 can be a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth.

Online service 104 provides one or more of various online services to users of computing devices 102, allowing users to share online experiences (e.g., play online games together, use other programs together, etc.). Service 104 is referred to as being an online service due to computing devices 102 accessing service 104 (and/or other computing devices 102) via network 106. Online service 104 includes an account access service 110, a game play service 112, a social networking service 114, a shared program service 116, and a matchmaking service 118, each of which can communicate with one another. Services 110-118 can communicate with one another within online service 104 and/or via computing devices 102. Although illustrated as including multiple services, it should be noted that online service 104 need not include all of the services 110-118 illustrated in FIG. 1. For example, online service 104 may not include social networking service 114 and/or shared program service 116.

Account access service 110 provides various functionality supporting user accounts of online service 104. Different users and/or computing devices 102 typically have different accounts with online service 104, and can log into their accounts via account access service 110. A user or computing device 102 logs into an account providing credential information, such as an id (e.g., user name, email address, etc.) and password, a digital certificate or other data from a smartcard, and so forth. Account access service 110 verifies or authenticates the credential information, allowing a user or computing device 102 to access the account if the credential information is verified or authenticated, and prohibiting the user or computing device 102 from accessing the account if the credential information is not verified or is not authenticated. Once a user's credential information is authenticated, the user can use the other services provided by online gamine service 104. Account access service 110 can also provide various additional account management functionality, such as permitting changes to the credential information, establishing new accounts, removing accounts, and so forth.

Game play service 112 provides various functionality supporting playing of one or more different games by users of computing devices 102. Different game titles can be supported by game play service 112 (e.g., one or more different sports game titles, one or more different strategy game titles, one or more different adventure game titles, one or more different simulation game titles, and so forth). A game title refers to a particular set of instructions that implement a game when executed (e.g., a set of instructions for a tennis game from a particular vendor, a set of instructions for a particular racing game from a particular vendor, etc). A particular running of a game title is also referred to as a game. Multiple games of the same game title can be played concurrently by different users, each game being a separate running of the game title. Games can be run and played as multi-player games in which multiple users of one or more computing devices 102 are playing the same game and each user is controlling one or more characters in the game.

Social networking service 114 provides various functionality supporting social networking to users of computing devices 102. Social networking allows users to share information with other users, such as comments, pictures, videos, links to Web sites, and so forth. This information can be shared by being posted to a wall or other location, being included in an album or library, being included in messages or other communications, and so forth.

Shared program service 116 provides various functionality supporting running of other programs (other than games) to users of computing devices 102. Various types of other programs can be provided by shared program service 116, such as audio and/or video playback programs, email or text messaging programs, telephone programs, video conferencing programs, and so forth. For example, shared program service 116 can include a cooking program allowing multiple users to talk to one another and/or see avatars representing one another while preparing various recipes. By way of another example, shared program service 116 can include an exercise program allowing multiple users to talk to one another and/or see avatars representing one another while exercising.

Online service 104 allows multiple users to share an online experience. An online experience refers to playing a game title from or otherwise using an online service (e.g., online service 104). A shared online experience or users sharing an online experience refers to two or more users playing the same game or using another program (e.g., of shared program service 116) concurrently via an online service (e.g., online service 104). The two or more users are typically, but need not be, using different computing devices 102 during sharing of the online experience. For example, multiple users can share an online experience by playing in a multi-player video game using game play service 112. By way of another example, multiple users can share an online experience by exercising at the same time using an exercise program of shared program service 116.

Matchmaking service 118 provides various functionality facilitating the selecting of other users with which a user of computing device 102 can share an online experience. Matchmaking service 118 can identify other users with which a particular user can share an online experience in a variety of different manners using a variety of different factors, as discussed in more detail below. Matchmaking service 118 can identify other users based on user accounts that account access service 110 is aware of, based on users logged into their accounts at a particular time (e.g., as indicated by account access service 110), based on accounts from other services, and so forth. Matchmaking service 118 can identify other users with which a user of computing device 102 can share an online experience across the same and/or different types of computing devices 102 (e.g., one or more users of a desktop computer and one or more users of a game console, one or more users of a phone and one or more users of a game console, etc.). Similarly, matchmaking service 118 can identify other users with which a user of computing device 102 can share an online experience across the same and/or different services (e.g., one or more users of game play service 112 and one or more users of another service of online gaming service 104).

Matchmaking service 118 includes a physical characteristics based user identification system 120. Physical characteristics based user identification system 120 detects physical characteristics of users of online service 104 and uses these detected physical characteristics in identifying other users for a particular user to share an online experience with as discussed in more detail below.

Each of services 110-118 can be implemented using one or more computing devices. Typically these computing devices are server computers, but any of a variety of different types of computing devices can alternatively be used (e.g., any of the types of devices discussed above with reference to computing device 102). Each of services 110-118 can be implemented using different computing devices, or alternatively at least part of one or more of services 110-118 can be implemented using the same computing device.

Each of services 110-118 is typically run by executing one or more programs. The programs that are executed to run a service 110-118 can be run on computing devices 102 and/or devices implementing online service 104. In one or more embodiments, services 110-118 are programs executed on computing devices 102 and the service 110-118 manages communication between different computing devices 102. In other embodiments, services 110-118 are programs executed on computing devices 102 and the service 110-118 facilitates establishing communication between different computing devices 102. After communication between two computing devices 102 is established, communication can be made between those two computing devices 102 without involving the service 110-118. In other embodiments, online service 104 can execute one or more programs for the service 110-118, receiving inputs from users of computing devices 102 and returning data indicating outputs to be generated for display or other presentation to the users of computing devices 102.

Additionally, although services 110-118 are illustrated as separate services, alternatively one or more of these services can be implemented as a single service. For example, game play service 112 and matchmaking service 118 can be implemented as a single service. Furthermore, the functionality of one or more of services 110-118 can be separated into multiple services. In addition, the functionality of online service 104 can be separated into multiple services. For example, online service 104 may include account access service 110 and game play service 112, a different service can include social networking service 114, a different service can include shared program service 116, and a different service can include matchmaking service 118.

Figure 2:
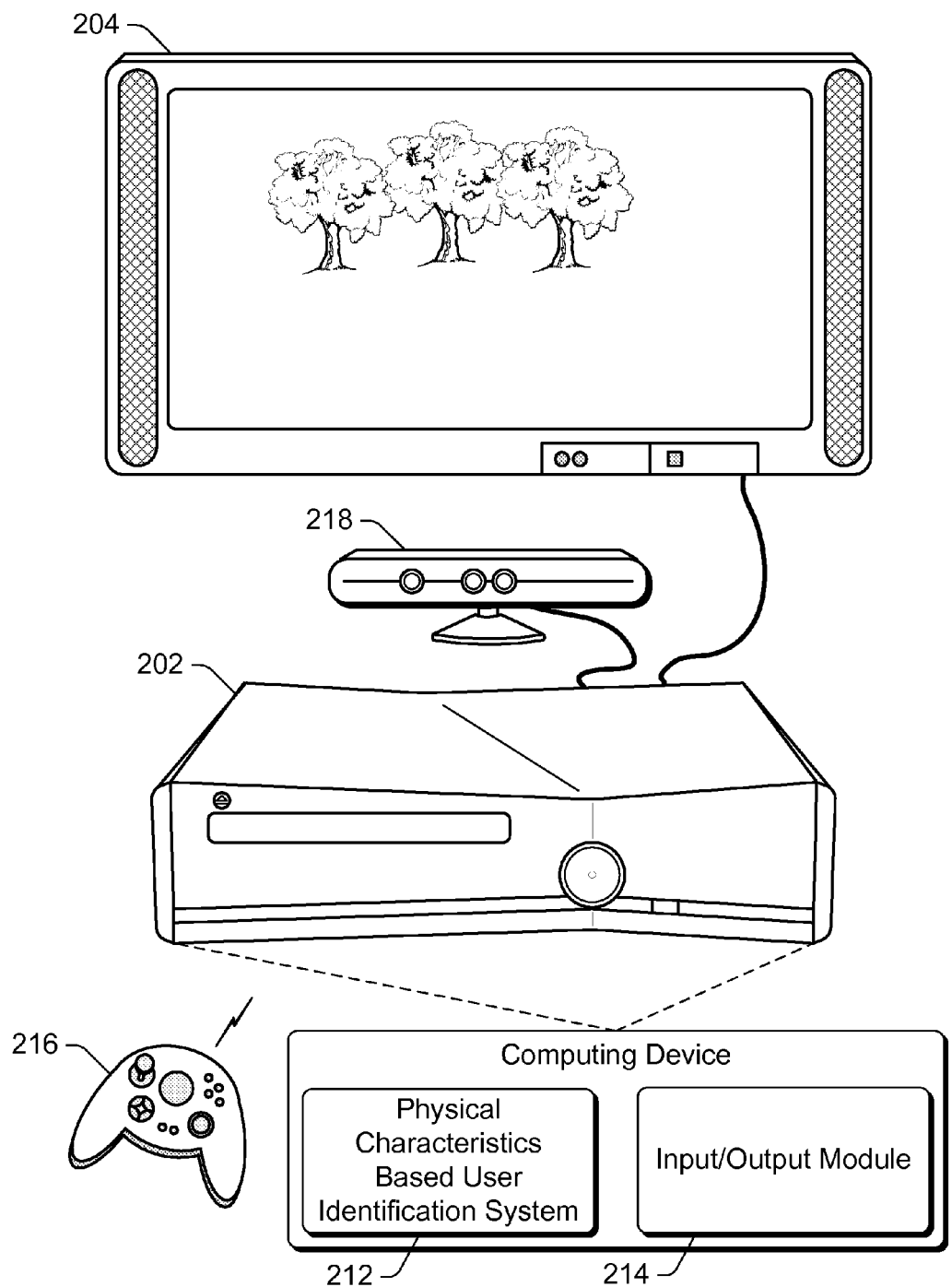
FIG. 2 illustrates an example computing device and display in additional detail in accordance with one or more embodiments.

FIG. 2 illustrates an example computing device and display in additional detail in accordance with one or more embodiments. FIG. 2 illustrates a computing device 202, which can be a computing device 102 of FIG. 1, coupled to a display device 204 (e.g., a television). Computing device 202 and display device 204 can communicate via a wired and/or wireless connection. Computing device 202 includes a physical characteristics based user identification system 212 and an input/output (I/O) module 214. Physical characteristics based user identification system 212 is analogous to physical characteristics based user identification system 120 of FIG. 1, although the physical characteristics based user identification system is illustrated as implemented in computing device 202 rather than in an online service.

Input/output module 214 provides functionality relating to recognition of inputs and/or provision of (e.g., display or other presentation of) outputs by computing device 202. For example, input/output module 214 can be configured to receive inputs from a keyboard or mouse, to identify gestures and cause operations to be performed that correspond to the gestures, and so forth. The inputs can be detected by input/output module 214 in a variety of different ways.

Input/output module 214 can be configured to receive one or more inputs via touch interaction with a hardware device, such as a controller 216 as illustrated. Touch interaction may involve pressing a button, moving a joystick, movement across a track pad, use of a touch screen of display device 204 or controller 216 (e.g., detection of a finger of a user's hand or a stylus), other physical inputs recognized by a motion detection component (e.g., shaking a device, rotating a device, etc.), and so forth. Recognition of the touch inputs can be leveraged by input/output module 214 to interact with a user interface output by computing device 202, such as to interact with a game, change one or more settings of computing device 202, and so forth. A variety of other hardware devices are also contemplated that involve touch interaction with the device. Examples of such hardware devices include a cursor control device (e.g., a mouse), a remote control (e.g., a television remote control), a mobile communication device (e.g., a wireless phone configured to control one or more operations of computing device 202), and other devices that involve touch on the part of a user or object.

Input/output module 214 can also be configured to receive one or more inputs in other manners that do not involve touch or physical contact. For example, input/output module 214 can be configured to receive audio inputs through use of a microphone (e.g., included as part of or coupled to computing device 202). By way of another example, input/output module 214 can be configured to recognize gestures, presented objects, images, and so forth through the use of a camera 218. The images can also be leveraged by computing device 202 to provide a variety of other functionality, such as techniques to identify particular users (e.g., through facial recognition), objects, and so on.

Computing device 202 can also leverage camera 218 to perform skeletal mapping along with feature extraction of particular points of a human body (e.g., 48 skeletal points) to track one or more users (e.g., four users simultaneously) to perform motion analysis. For instance, camera 218 can capture images that are analyzed by input/output module 214 or a game or other program running on computing device 202 to recognize one or more motions made by a user, including what body part is used to make the motion as well as which user made the motion. The motions can be identified as gestures by input/output module 214 or the running game or other program to initiate a corresponding operation. Similarly, such images can be analyzed by input/output module 214 or a game or other program running on computing device 202 to recognize the speed of a motion made by a user, such as how fast the user moved his or her arm, how fast the user moved an item (e.g., a drumstick), and so forth.

The physical characteristics based user identification system (e.g., system 212 of FIG. 2 or system 120 of FIG. 1) detects physical characteristics of a user. In one or more embodiments, the detecting of a user's physical characteristics is performed only after receiving user consent to do so. This user consent can be an opt-in consent, where the user takes an affirmative action to request that the physical characteristics detection be performed before any of that user's physical characteristics are detected. Alternatively, this user consent can be an opt-out consent, where the user takes an affirmative action to request that the detection of that user's physical characteristics not be performed. If the user does not choose to opt out of this detecting, then it is an implied consent by the user to detect that user's physical characteristics. Similarly, any other data mining or obtaining of information regarding the user can be performed only after receiving user consent to do so.

Figure 3:
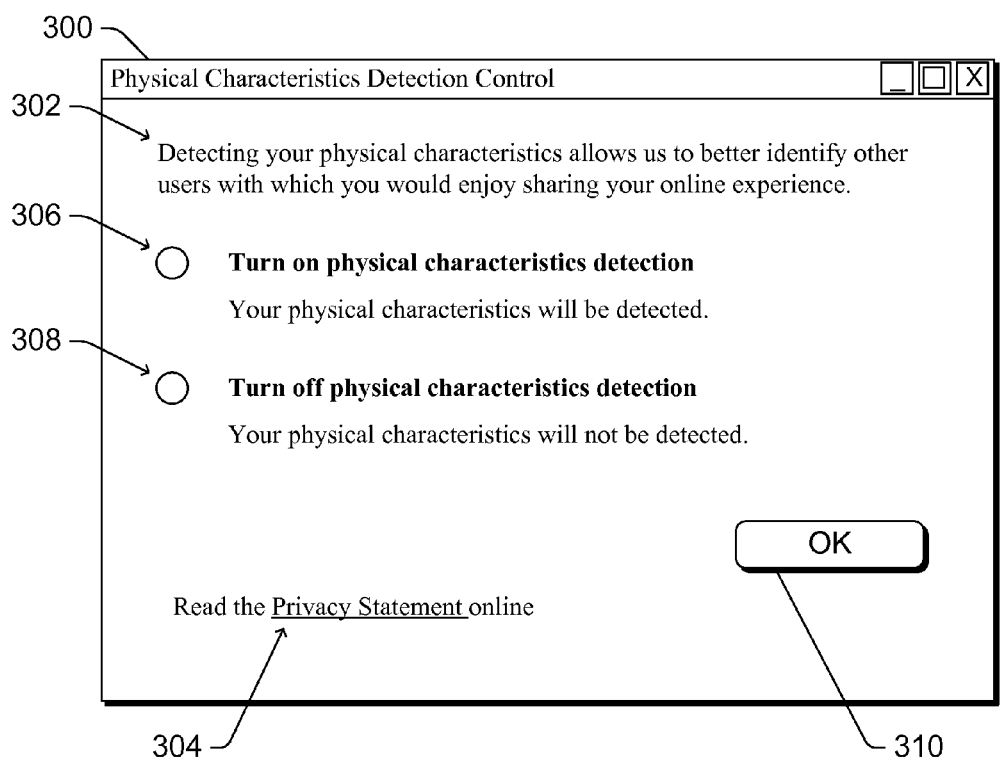
FIG. 3 illustrates an example user interface that can be displayed to a user to allow the user to select whether his or her physical characteristics will be detected in accordance with one or more embodiments.

FIG. 3 illustrates an example user interface that can be displayed to a user to allow the user to select whether his or her physical characteristics will be detected in accordance with one or more embodiments. A physical characteristics detection control window 300 is displayed including a description 302 explaining to the user why his or her physical characteristics are being detected. A link 304 to a privacy statement is also displayed. If the user selects link 304, a privacy statement (e.g. of online service 104 of FIG. 1) is displayed explaining to the user how the user's information is kept confidential.

Additionally, the user is able to select a radio button 306 to opt-in to the physical characteristics detection, or a radio button 308 to opt-out of the physical characteristics detection. Once a radio button 306 or 308 is selected, the user can select an "OK" button 310 to have the selection saved. It should be noted that radio buttons and an "OK" button are only examples of user interfaces that can be presented to a user to opt-in or opt-out of the physical characteristics detection, and that a variety of other conventional user interface techniques can alternatively be used. The physical characteristics based user identification system then proceeds to detect physical characteristics, or not collect detect physical characteristics, in accordance with the user's selection.

Figure 4:
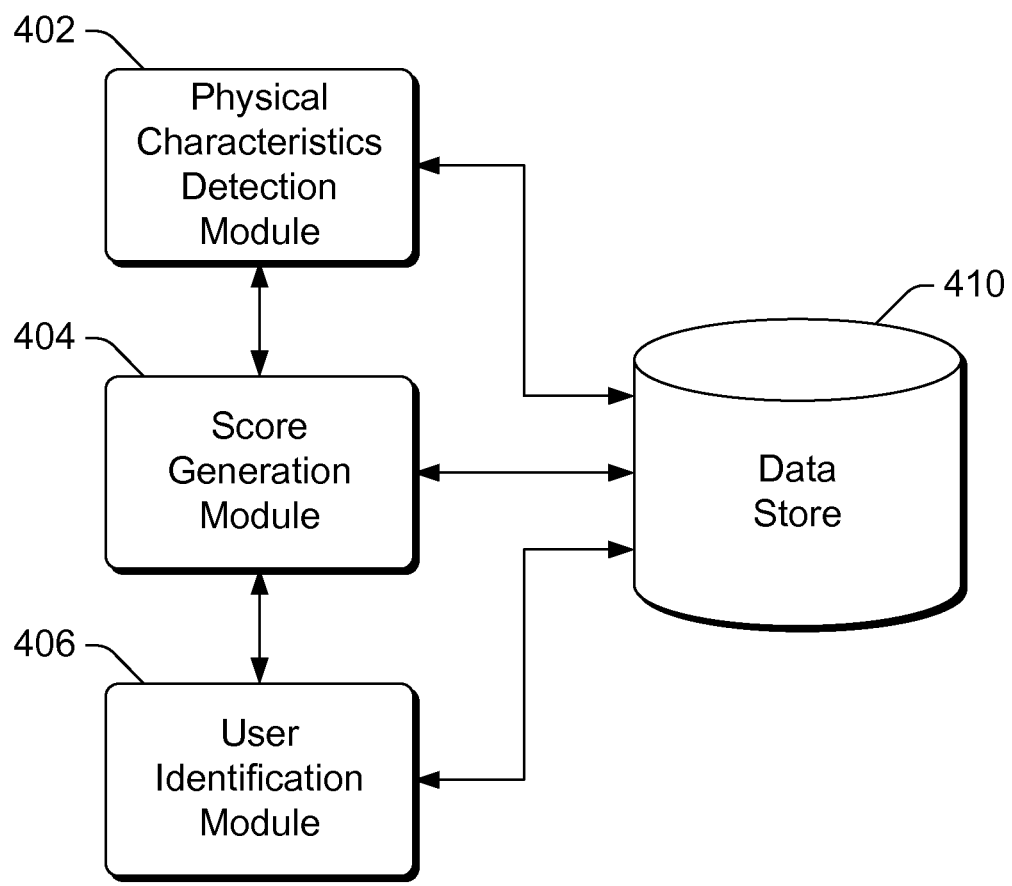
FIG. 4 illustrates an example physical characteristics based user identification system in accordance with one or more embodiments.

FIG. 4 illustrates an example physical characteristics based user identification system 400 in accordance with one or more embodiments. Physical characteristics based user identification system 400 can be, for example, a physical characteristics based user identification system 120 of FIG. 1 or a physical characteristics based user identification system 212 of FIG. 2. Physical characteristics based user identification system 400 can be implemented at least in part in an online service (e.g., online service 104 of FIG. 1) and/or at least in part in a computing device (e.g., a computing device 102 of FIG. 1 or computing device 202 of FIG. 2).

Physical characteristics based user identification system 400 can be implemented as part of one or more game titles (e.g., game titles of game play service 112 of FIG. 1) or other programs (e.g., programs of shared program service 116). Alternatively, physical characteristics based user identification system 400 can be implemented as a separate service that can be invoked by one or more game titles. For example, system 400 can be implemented as part of matchmaking service 118 of FIG. 1, and invoked by one or more game titles (e.g., game titles of game play service 112 of FIG. 1) or other programs (e.g., programs of shared program service 116).

System 400 includes a physical characteristics detection module 402, a score generation module 404, a user identification module 406, and a data store 410. Generally, physical characteristics detection module 402 detects various physical characteristics of users of system 400. Score generation module 404 analyzes the detected physical characteristics for a user, and generates a score for that user that represents one or more of the physical characteristics of that user. Score generation module 404 provides the generated score to user identification module 406, which can identify multiple users to share an online experience based on the generated scores.

Physical characteristics detection module 402 detects various types of physical characteristics of a user of system 400. These physical characteristics can include both physical attributes and physical skills. Physical attributes refer to the size or other physical descriptions of a user. For example, physical attributes of a user can include one or more of: the user's height, the user's age, the user's weight, the user's arm length, the user's leg length, and so forth. Physical skills refer to the capabilities of a user or the manner in which the user physically moves. For example, physical skills of a user can include how high the user can jump, how fast the user can move his or her legs running in place, how fast the user can swing his or her arms, how fast the user can move drumsticks, how fast the user can move his or her fingers when playing a guitar, the user's reaction time, the user's vocal range, and so forth. By way of further example, physical skills of a user can include particular manners in which the user plays a game (e.g., for a fighting game, is the user wind-milling (e.g., constantly moving) his or her arms, or are the user's arm motions distinct motions (e.g., individual punches)).

Physical characteristics can also optionally refer to capabilities of sensors or components that are detecting physical attributes and/or physical skills of users. Different sensors, modules, components, and so forth can be used to detect physical attributes and/or physical skills as discussed in more detail below. Associated with (or provided by) these sensors, modules, components, and so forth can be an indication (e.g., a rating or numeric value) of how well the sensors, modules, components, and so forth can detect the physical attributes and/or physical skills. Different sensors, modules, or components can detect physical attributes and/or physical skills of different users differently (e.g., based on the physical attributes or skills of the users, the clothing the users are wearing, the rooms that the users are in, and so forth). Different indications of how well the physical attributes and/or physical skills can be detected can be associated with (or provided by) these sensors, modules, or components for different users (e.g., based on the user's physical attributes or skills, the user's clothing, the rooms that the users are in, and so forth). This indication can be included as a physical characteristic of the user.

Physical characteristics detection module 402 can detect the physical characteristics of a user of system 400 in one or more of a variety of different manners. Module 402 can detect physical characteristics based on data provided by the user. For example, the user can specify his or her age, weight, height, arm length, and so forth. By way of another example, the user can specify his or her date of birth, and module 402 can readily determine his or her age at any given time based on the specified date of birth.

Physical characteristics detection module 402 can also detect the physical characteristics of a user of system 400 based on captured images (e.g., images captured by a camera 218 of FIG. 2). Module 402 can analyze captured images to identify parts of the user's body, such as arms, legs, feet, and so forth, and determine physical characteristics of the user based on that analysis. For example, by analyzing captured images module 402 can readily determine how fast a user's arm moves, how fast a user moves an item (e.g., a drumstick), and so forth. Additionally, given a reference measurement (e.g., the height of the user, the width of some other item in a captured image), module 402 can analyze captured images to identify various dimensions. For example, by analyzing captured images module 402 can readily determine the length of a user's arm, how high a user jumps, and so forth.

Physical characteristics detection module 402 can also detect the physical characteristics of a user of system 400 based on various other sensors or inputs. For example, a microphone can capture audio data and module 402 can analyze the captured audio data to detect a vocal range of a user. By way of another example, sensors (e.g., accelerometers, gyroscopes, etc.) worn by or strapped to the user can capture various data regarding movements of a user, and module 402 can analyze the captured data to detect various physical characteristics of the user (e.g., the speed at which the user moves particular parts of his or her body). By way of yet another example, sensors (e.g., accelerometers, gyroscopes, etc.) included in a controller used by the user (e.g., a controller 216 of FIG. 2) can capture various data regarding movements of the controller, and module 402 can analyze the captured data to detect various physical characteristics of the user (e.g., the speed at which the user moves his or her hands or arms holding the controller).

Regardless of the manner in which module 402 detects the physical characteristics of the user, module 402 stores data indicating the detected physical characteristics (also referred to as simply storing the detected physical characteristics) in data store 410 as associated with the user. Alternatively, the physical characteristics of the user can be provided to score generation module 404 by module 402 without being stored in data store 410. Module 402 can detect physical characteristics at various times, such as as part of an initialization or setup process, and/or during the running of various games or other programs. Different physical characteristics of a user can be detected by module 402 at different times and added to the physical characteristics of that user in data store 410 as the physical characteristics are detected. For example, the height and arm length of a user can be detected during an initialization process (e.g., when the user first logs into an online service, such as online service 104 of FIG. 1), and stored in data store 410 as associated with that user (e.g., based on the user name, or based on the user id used with the online service). When the user subsequently plays a game, additional physical characteristics can be detected by module 402, such as how fast the user moves his or her arms, how high the user jumps, and so forth. Module 402 also stores these additionally detected physical characteristics in data store 410 as associated with that user.

It should be noted that situations can arise in which the physical characteristics of a user change over time. For example, the user's age can change over time, or how high a user can jump can change over time. Physical characteristics detection module 402 can detect the same physical characteristics at different times and add later detected physical characteristics to data store 410 in a variety of different manners. Later detected physical characteristics can be added to data store 410 by overwriting or replacing previously detected physical characteristics (e.g., the later detected age of a user can replace the previously detected age of the user). Alternatively, later detected physical characteristics can be added to data store 410 by being combined with the previously detected physical characteristics. This combining can take various forms, such as averaging the later detected and previously detected physical characteristics, performing a weighted averaging of the later detected and previously detected physical characteristics so the average of the later and previously detected physical characteristics is attributed more to the values of the later detected physical characteristics than the previously detected physical characteristics, and so forth.

In addition to (or alternatively in place of) associating physical characteristics with a user, module 402 can associate detected physical characteristics with a group or collection of users. Groups of users can be defined in different manners, such as by a developer or vendor of system 400, by an online service using system 400, by users of system 400, and so forth. For example, groups can be defined as mother/daughter pairs, sibling pairs, foursomes, and so forth. The physical characteristics of the individual users in a group can be maintained along with the physical characteristics of the group, or alternatively the physical characteristics of the group can be maintained without maintaining the physical characteristics of the individual users in that group. The physical characteristics of the group can be determined based on the detected physical characteristics of the individual users in a variety of different manners. For example, the values for detected physical characteristics of the individuals can be added together, the values for detected physical characteristics of the individuals can be averaged together, and so forth. By way of another example, a highest or lowest value for each detected characteristic can be selected and used as the value for that physical characteristic of the group (e.g., a value indicating how high the group can jump can be the highest or lowest detected value of how high an individual user in that group can jump).

Additionally, a type of each group of users can be maintained in data store 410 as being associated with the physical characteristics of those groups of users. The type of a group refers to how the group is defined. For example, types of groups of users can be foursomes, threesomes, mother/daughter pairs, sibling pairs, and so forth. These types can be used, for example, by user identification module 406 in identifying groups of users to share an online experience, as discussed in more detail below.

In one or more embodiments, the physical characteristics detected by physical characteristics detection module 402 (and stored in data store 410) are associated with actions within a game or other program. This association is performed by detecting a physical characteristic and determining how well an action within a game or other program was performed based on that physical characteristic. For example, a user can swing his or her arms to control swinging of a baseball bat in a game. The speed with which the user swings his or her arms can be associated with the result of the swinging of the baseball bat (e.g., whether the bat hit a ball, a distance that the bat hit the ball, etc.). Thus, not only is the physical characteristic (e.g., the speed at which the user can swing his or her arms) recorded, but an indication of how well that speed translates to a desired action within a game (e.g., distance that the ball is hit) or other program is also recorded.

The detected physical characteristics maintained in data store 410 for a user can be specific to a particular game title or other program or service, being stored and used by just that particular game title. Alternatively, system 400 can be made available to multiple game titles, programs, and/or services. For example, each of various different game titles or other programs can include or invoke a detection module 402 that detects and stores physical characteristics for a user while using that game title or other program. Any of multiple different game titles or other programs can then retrieve the physical characteristics for a user from data store 410. Different game titles or programs can use the same physical characteristics, or alternatively different game titles or programs can use different physical characteristics.

Score generation module 404 analyzes the physical characteristics detected by module 402 for a user, and generates a score for that user that represents one or more of the physical characteristics of that user. The score for a user can be generated as the physical characteristics are detected, such as each time data for a physical characteristic is stored in data store 410. Alternatively, the score for a user can be generated at other times or in response to other events, such as at regular or irregular intervals, in response to a user logging into (or logging off) an online service (e.g., online service 104 of FIG. 1), in response to the user stopping playing a particular game, in response to a request for scores from user identification module 406, and so forth. One or more scores (based on various combinations of physical characteristics) generated by module 404 for a user can be stored in data store 410, or alternatively provided to user identification module 406 without being stored in data store 410.

Score generation module 404 can generate a score for a user based on all of the physical characteristics of the user stored in data store 410, or alternatively only selected physical characteristics. The particular physical characteristics used by module 404 to generate a score can be determined in different manners, such as being received from a particular game or program, being received from user identification module 406, being received from another component or module of a matchmaking service (e.g., matchmaking service 118 of FIG. 1), and so forth.

Score generation module 404 can generate a score representing physical characteristics of a user in a variety of different manners. For example, the data for physical characteristics of a user can be obtained from data store 410 and combined by being added together, averaged together, combined according to some other rules or algorithms, and so forth. The score generated by module 404 for a user is an indication of the physical characteristics of the user, and the meaning of a particular score varies based on the physical characteristics used to generate the score. For example, the score generated by module 404 can be an indication of a size of a user, an indication of how fast the user moves, an indication of how well the user plays a drum set, an indication of how high the user can jump, and so forth.

In one or more embodiments, the data for the physical characteristics of a user are optionally weighted to allow certain physical characteristics to more heavily influence the score generated by module 404 than other physical characteristics. The weights that are applied can be determined in different manners, such as based on empirical analysis performed by a developer or administrator of system 400, based on user inputs (e.g., a user of system 400 indicating the weights that he or she desires to have used), and so forth. For example, score generation module 404 can multiply the data value for each of multiple physical characteristics of the user by the weight associated with that physical characteristic to generate a weighted value. It should be noted that weights can include positive numbers, negative numbers, integers, fractions, combinations thereof, and so forth. Module 404 can then add, average, or otherwise combine the weighted values to generate the score.

Score generation module 404 can also optionally include various other factors into the score being generated. For example, in generating a score for a user score generation module 404 can rely on factors such as the geographic location of the user, data of the user identified in a social networking service (e.g., social networking service 114 of FIG. 1), friends of the user identified in a social networking service (e.g., social networking service 114 of FIG. 1), an experience or skill level of the user in playing a game or using a particular program, and so forth.

In one or more embodiments, score generation module 404 receives an indication of multiple users (e.g., from user identification module 406) for which scores are desired. Score generation module 404 generates scores for ones of those multiple users for which scores have not already been generated (e.g., and stored in data store 410), or obtains (e.g., from data store 410) scores that module 404 has already generated. Alternatively, score generation module 404 can generate scores for users and store those scores in data store 410, and another component or module (e.g., user identification module 406) can obtain the scores from data store 410.

User identification module 406 identifies multiple users to share an online experience based on the scores generated by score generation module 404. This shared online experience can be, for example, playing a particular multi-player game together or using another program together. Identification of users to share an online experience is also referred to as matchmaking. User identification module 406 can identify the multiple users in different manners.

In one or more embodiments, user identification module 406 receives or otherwise obtains an identifier of a particular user, referred to as the subject user, for which another user is to be selected to share an online experience with the subject user. The subject user can be, for example, a user of an online service (e.g., online service 104 of FIG. 1) requesting to play a multi-player game with another. An indication of other users for which scores are to be obtained is also received or otherwise obtained. These other users can be identified in different manners, such as users that are currently logged into the online service, users that are currently logged into the online service and already playing (or waiting to play) the same multi-player game. These other users can also be users that are included in a social graph of the subject user. The social graph of a user refers to friends of that user in a social networking service (e.g., social networking service 114 of FIG. 1), and optionally one or more additional levels or steps of friends. Each level or step refers to a group of friends of each user in the previous level or step. For example, the first level or step is friends of the user, the second level or step is friends of the user's friends, the third level or step is friends of the friends of the user's friends, and so forth. Thus, the social graph for a particular user can include other users known to that particular user, as well as optionally additional users (e.g., a friend of a friend). The number of levels or steps in the user's social graph can be determined in different manners, such as by system 400, by the user, and so forth.

User identification module 406 can identify, based on the scores generated by score generation module 404, one or more of the other users to share an online experience with the subject user in various manners. In one or more embodiments, user identification module 406 identifies the one of the other users having the highest generated score, the one of the other users having the generated score closest to the generated score of the subject user, the one of the other users having the generated score at least a threshold amount above or below the generated score of the subject user, and so forth. In other embodiments, user identification module 406 identifies multiple ones of the other users having the highest generated scores (e.g., the ten highest scores or the highest 10% of the scores), identifies multiple ones of the other users having scores that meet (e.g., equal or exceed) a threshold value, identifies multiple ones of the other users having scores within a threshold amount of the generated score of the subject user, identifies multiple ones of the other users having scores in a range between first and second threshold amounts from the generated score, and so forth.

Alternatively, user identification module 406 can identify multiple users to share an online experience based on the detected physical characteristics without relying on scores generated by score generation module 404. User identification module 406 can identify one or more other users to share an online experience with the subject user in various manners analogous to the discussion above regarding identifying one or more of the other users based on the score generated by module 404, but using the detected physical characteristics instead. For example, rather than identifying multiple ones of the other users having scores that meet a threshold value, module 406 can identify identifies multiple ones of the other users having particular detected physical characteristics that meet a threshold value (e.g., multiple ones of the other users that can jump at least a certain height).

Additionally, user identification module 406 can take various actions based on the identified users, such as automatically selecting an identified user (e.g., the user having the score closest to the generated score of the subject user). Module 406 can provide an indication of the automatically selected user to another service for an online experience including the identified user and the subject user. For example, module 406 can provide an indication of the two users (the selected and subject users) to a game play service 112 of FIG. 1, which in turn establishes an online multi-player game including those two users.

Alternatively, rather than automatically selecting another user, user identification module 406 can display or otherwise present identifiers of (e.g., user names, user id's or tags in the online system (e.g., online system 104 of FIG. 1), etc.) the identified users to the subject user. The scores generated for each of those identified users can optionally be presented to the subject user. The number of users that are identified can be determined in different manners, such as a fixed number of users (e.g., seven users) or a variable number of users (e.g., 10% of the number of users in the subject user's social graph that are currently logged into the online service). The subject user can then provide an input to choose at least one of those identified users. Indications of the chosen user (or chosen users) and the subject user are provided to another service for an online experience including the chosen user and the subject user (e.g., playing of a multi-player game), optionally only if the chosen user (or chosen users) accepts an invitation or otherwise agrees to being included in the shared online experience.

Although discussed herein as generating a score for a user, it should be noted that score generation module 404 can alternatively generate a score for a group or collection of users. Such a group of users can be a group for which physical characteristics are detected by module 402 and stored in data store 410 as discussed above. Alternatively, an indication of a group of users can be provided to score generation module 404, and module 404 can obtain data for the physical characteristics of the individual users in that group from data store 410 and generate a score for the group based on the data obtained from data store 410.

Furthermore, user identification module 406 can identify groups of users analogous to the discussion above regarding identification of users. For example, the subject user can be a subject group of users, and the other users identified are other groups of users of the same type as the subject group. E.g., if the subject group is a mother/daughter pair of users, then user identification module 406 can identify other groups that are also mother/daughter pairs of users. The type of each group is stored, for example, in data store 410 as discussed above.

Figure 5:
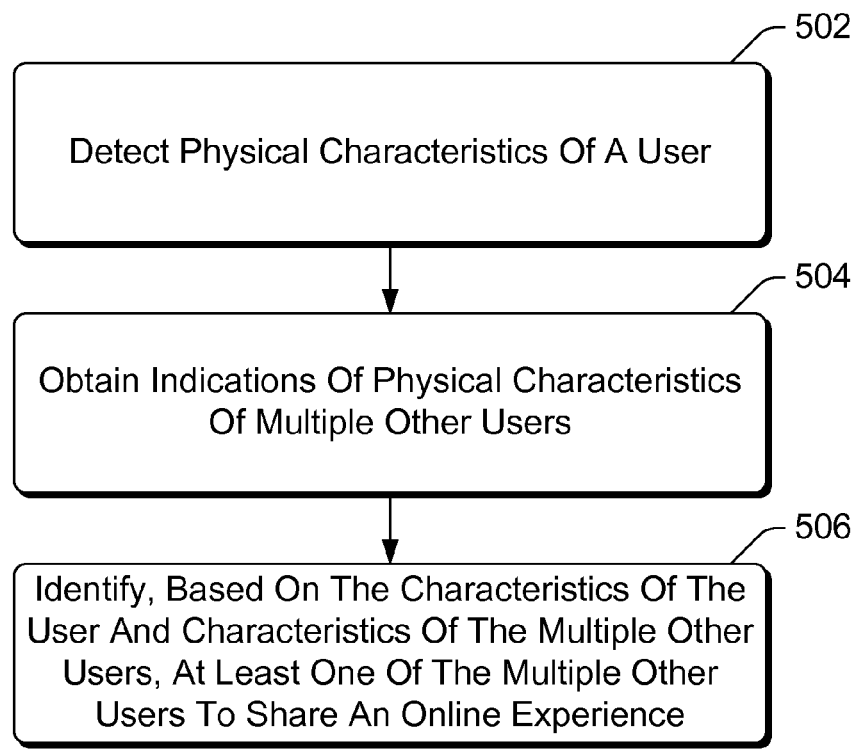
FIG. 5 is a flowchart illustrating an example process for implementing physical characteristics based user identification for matchmaking in accordance with one or more embodiments.

FIG. 5 is a flowchart illustrating an example process 500 for implementing physical characteristics based user identification for matchmaking in accordance with one or more embodiments. Process 500 is carried out by a system, such as system 400 of FIG. 4, and can be implemented in software, firmware, hardware, or combinations thereof. Process 500 is shown as a set of acts and is not limited to the order shown for performing the operations of the various acts. Process 500 is an example process for implementing physical characteristics based user identification for matchmaking; additional discussions of implementing physical characteristics based user identification for matchmaking are included herein with reference to different figures.

In process 500, physical characteristics of a user are detected (act 502). These physical characteristics can be detected in a variety of different manners, such as based on data provided by the user, captured images, data captured by other sensors, and so forth as discussed above.

Indications of physical characteristics of multiple other users are obtained (act 504). These physical characteristics of other users can have been previously detected by the system implementing process 500.

At least one of the multiple other users is identified, based on the detected physical characteristics, to share an online experience with the user (act 506). This identification can take different forms as discussed above, such as identifying ones of the other users having particular scores generated based on their physical characteristics. The identified at least one other user can be automatically selected to be included in a shared online experience, or can be identified to the subject user so that the subject user can choose one or more of the identified users with which to share the online experience as discussed above.

Figure 6:
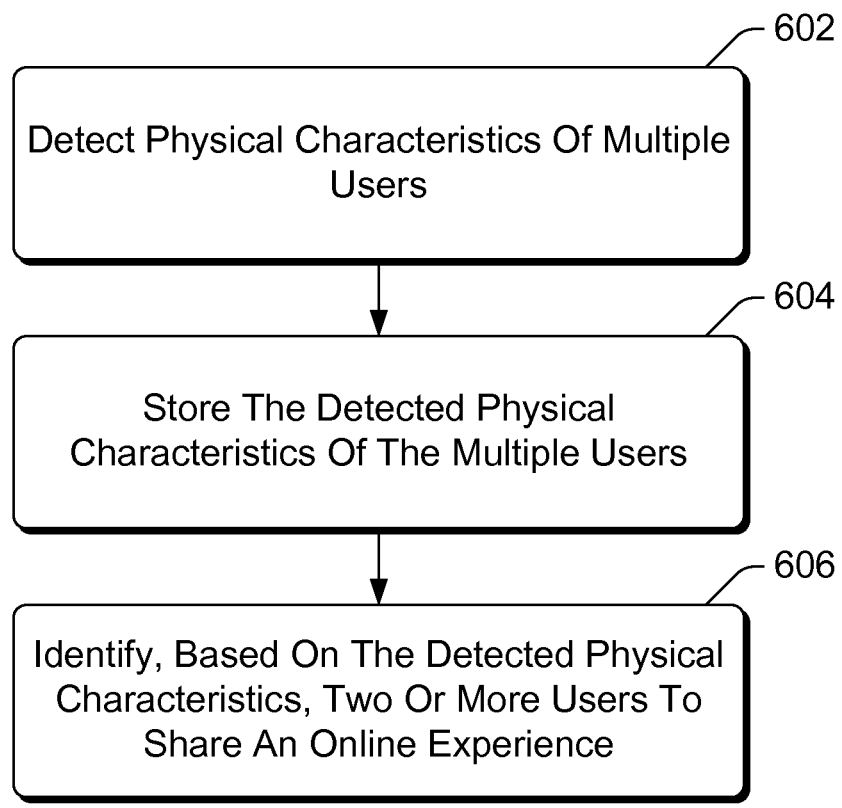
FIG. 6 is a flowchart illustrating an example process for implementing physical characteristics based user identification for matchmaking in accordance with one or more embodiments.

FIG. 6 is a flowchart illustrating an example process 600 for implementing physical characteristics based user identification for matchmaking in accordance with one or more embodiments. Process 600 is carried out by a system, such as system 400 of FIG. 4, and can be implemented in software, firmware, hardware, or combinations thereof. Process 600 is shown as a set of acts and is not limited to the order shown for performing the operations of the various acts. Process 600 is an example process for implementing physical characteristics based user identification for matchmaking; additional discussions of implementing physical characteristics based user identification for matchmaking are included herein with reference to different figures.

In process 600, physical characteristics of multiple users are detected (act 602). These physical characteristics can be detected in a variety of different manners, such as based on data provided by the user, captured images, data captured by other sensors, and so forth as discussed above.

The detected physical characteristics of the multiple users are stored (act 604). This storing of physical characteristics can be, for example, storing data representing the detected physical characteristics in a data store as discussed above.

Two or more users to share an online experience are identified based on the detected physical characteristics (act 606). This identification can take different forms as discussed above, such as identifying ones of the other users having particular scores generated based on their physical characteristics. The identified two or more other users can be automatically selected to be included in a shared online experience, or one or more other users can be identified to a subject user so that the subject user can choose one or more of the identified users with which to share the online experience as discussed above.

The physical characteristics based user identification for matchmaking techniques discussed herein support various usage scenarios. For example, an online game play service can receive a request from a particular user to play a particular game title. Various other users having similar physical characteristics (e.g., scores close in value as generated from their physical characteristics) can be identified and presented to the particular user, from which the particular user can choose who he or she would like to play the game title with. The particular user can be expected to enjoy playing a game with the identified other users due to the similar physical characteristics of the particular user and the identified other users.

By way of another example, an online game play service can receive a request from a particular group of users (e.g., a foursome, a mother/daughter pair, etc.) to play a particular game title. Various other groups of users having similar physical characteristics (e.g., scores close in value as generated from their physical characteristics) can be identified and presented to the particular group of users, from which the particular group of users can choose who they would like to play the game title with. The particular group of users can be expected to enjoy playing a game with the identified other groups of users due to the similar physical characteristics of the particular group of users and the identified other groups of users.

By way of still another example, an online game play service can receive a request from a particular user to play a particular game title with another user having particular physical characteristics (e.g., a user having a score generated based on his or her physical characteristics that is below or above the particular user's score generated based on the particular user's physical characteristics). One or more other users having those particular physical characteristics can be identified and presented to the particular user, from which the particular user can choose who he or she would like to play the game title with. The particular user can be expected to enjoy playing a game with the identified other users due to the identified other users having the particular physical characteristics specified by the particular user.

Various actions such as communicating, receiving, storing, generating, obtaining, and so forth performed by various modules are discussed herein. It should be noted that the various modules can cause such actions to be performed. A particular module causing an action to be performed includes that particular module itself performing the action, or alternatively that particular module invoking or otherwise accessing another component or module that performs the action (or performs the action in conjunction with that particular module).

Figure 7:
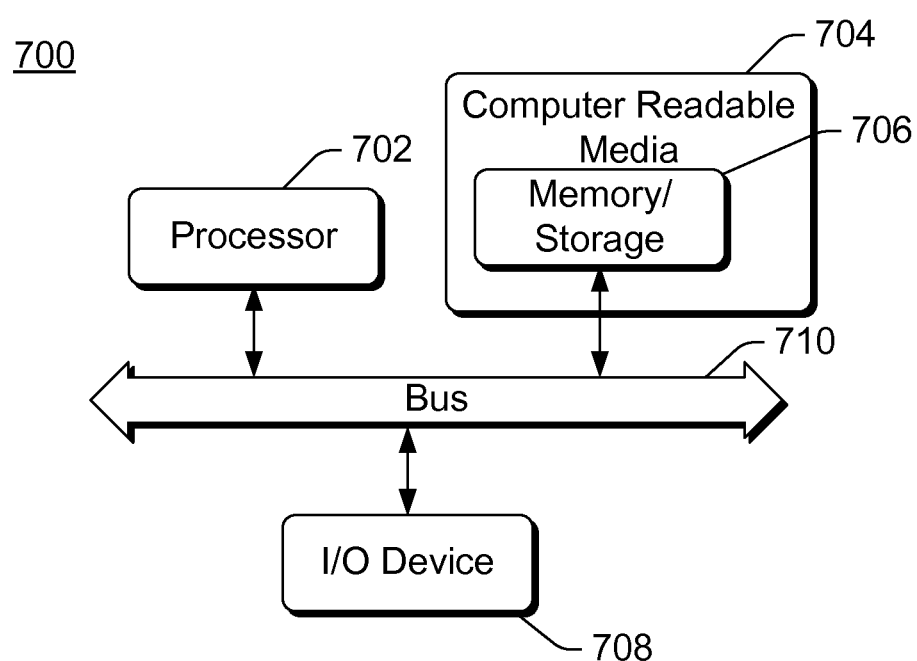
FIG. 7 illustrates an example computing device that can be configured to implement the physical characteristics based user identification for matchmaking in accordance with one or more embodiments.

FIG. 7 illustrates an example computing device 700 that can be configured to implement the physical characteristics based user identification for matchmaking in accordance with one or more embodiments. Computing device 700 can, for example, be a computing device 102 of FIG. 1, implement at least part of online service 104 of FIG. 1, be a computing device 202 of FIG. 2, or implement at least part of system 400 of FIG. 4.

Computing device 700 includes one or more processors or processing units 702, one or more computer readable media 704 which can include one or more memory and/or storage components 706, one or more input/output (I/O) devices 708, and a bus 710 that allows the various components and devices to communicate with one another. Computer readable media 704 and/or one or more I/O devices 708 can be included as part of, or alternatively may be coupled to, computing device 700. Bus 710 represents one or more of several types of bus structures, including a memory bus or memory controller, a peripheral bus, an accelerated graphics port, a processor or local bus, and so forth using a variety of different bus architectures. Bus 710 can include wired and/or wireless buses.

Memory/storage component 706 represents one or more computer storage media. Component 706 can include volatile media (such as random access memory (RAM)) and/or non-volatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 702. It is to be appreciated that different instructions can be stored in different components of computing device 700, such as in a processing unit 702, in various cache memories of a processing unit 702, in other cache memories of device 700 (not shown), on other computer readable media, and so forth. Additionally, it is to be appreciated that the location where instructions are stored in computing device 700 can change over time.

One or more input/output devices 708 allow a user to enter commands and information to computing device 700, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 7. The features of the physical characteristics based user identification for matchmaking techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   identifying a user of an online service based on the user logging into the online service and verification of the user's credential information by an account access service;
   identifying, from a social networking service, multiple additional users that are friends of the user; and
   identifying, by one or more devices analyzing data captured by one or more sensors and based at least in part on one or more physical characteristics of the user and one or more physical characteristics of at least one of the multiple additional users, at least one of the multiple additional users with which to share an online experience with the user.

2. A method as recited in claim 1, the one or more physical characteristics of the user including at least one physical characteristic that is detected during an initialization process and stored as associated with the user.

3. A method as recited in claim 2, the at least one physical characteristic that is detected during the initialization process being stored based on a user id used by the user with the online service.

4. A method as recited in claim 1, the shared online experience comprising playing a multi-player game.

5. A method as recited in claim 4, the multiple additional users comprising friends of the user that are already playing the multi-player game.

6. A method as recited in claim 1, the multiple additional users comprising friends of the user that are currently logged into the online service.

7. A method as recited in claim 1, the one or more physical characteristics of the user including one or more physical attributes of the user, and the one or more physical characteristics of each of the at least one of the multiple additional users including one or more physical attributes of the additional user.

8. A method as recited in claim 1, the one or more physical characteristics of the user including one or more physical skills of the user, and the one or more physical characteristics of each of the at least one of the multiple additional users including one or more physical skills of the additional user.

9. A method as recited in claim 1, the one or more physical characteristics of the user including an indication of a capability of a sensor to detect physical attributes or physical skills of the user, and the one or more physical characteristics of each of the at least one of the multiple additional users including an indication of a capability of a sensor to detect physical attributes or physical skills of the additional user.

10. A method as recited in claim 1, the identifying at least one of the multiple additional users with which to share an online experience with the user comprising identifying the at least one of the multiple additional users based on a score of the user and a score of each of the multiple additional users, the score of the user being generated based on the one or more physical characteristics of the user, and the score of each of the multiple additional users being based on the one or more physical characteristics of the additional user.

11. A method as recited in claim 10, the score of the user having been generated by associating different weights with different physical characteristics of the one or more physical characteristics.

12. A computing device comprising:
one or more processors; and
one or more physical computer storage media devices having stored thereon multiple instructions that, responsive to execution by the one or more processors, cause the one or more processors to perform acts comprising:
identifying a particular user of an online service based on the particular user logging into the online service and verification of the particular user's credential information by an account access service;
identifying, from a social networking service, multiple users that are included in a social graph of the particular user; and
identifying, based at least in part on one or more physical characteristics of the particular user obtained by analyzing data captured by one or more sensors and one or more physical characteristics of at least one of the multiple users, at least one of the multiple users with which to share an online experience with the particular user.

13. A computing device as recited in claim 12, the multiple users comprising friends of the user that are currently logged into the online service.

14. A computing device as recited in claim 12, the shared online experience comprising playing a multi-player game.

15. A computing device as recited in claim 14, the multiple users comprising friends of the user that are already playing the multi-player game.

16. A computing device as recited in claim 12, the social graph of the particular user comprising friends of the particular user in the social networking service.

17. A computing device as recited in claim 16, the social graph of the particular user further comprising one or more additional levels or steps of friends in the social networking service.

18. A computing device as recited in claim 12, the one or more physical characteristics of the particular user including one or more physical attributes of the particular user, and the one or more physical characteristics of each of the at least one of the multiple users including one or more physical attributes of the user.

19. A computing device as recited in claim 12, the one or more physical characteristics of the particular user including one or more physical skills of the particular user, and the one or more physical characteristics of each of the at least one of the multiple users including one or more physical skills of the user.

20. A computing device as recited in claim 12, the one or more physical characteristics of the particular user including an indication of a capability of a sensor to detect physical attributes or physical skills of the particular user, and the one or more physical characteristics of each of the at least one of the multiple users including an indication of a capability of a sensor to detect physical attributes or physical skills of the user.

* * * * *